D. Fasig,

Hay Knife.

No. 100,611.   Patented Mar. 8, 1870.

Witnesses.
E. W. Anderson
A. A. Kane

Inventor.
Daniel Fasig
Chipman Hosmer & Co
Attorneys

United States Patent Office.

DANIEL FASIG, OF ROWSBURY, OHIO.

Letters Patent No. 100,611, dated March 8, 1870.

IMPROVEMENT IN COMBINED HAY-KNIFE AND PRUNING-HOOK.

The Schedule referred to in these Letters Patent and making part of the same.

*To all whom it may concern:*

Be it known that I, DANIEL FASIG, of Rowsbury, in the county of Ashland, and State of Ohio, have invented a new and valuable Improvement in Hay-Knife and Pruner; and I do hereby declare that the following is a full, clear, and exact description of the construction and operation of the same, reference being had to the annexed drawings making a part of this specification, and to the letters and figures of reference marked thereon.

Figure 1:

Figure 1 of the drawings is a edge view of my invention.

Figure 2:
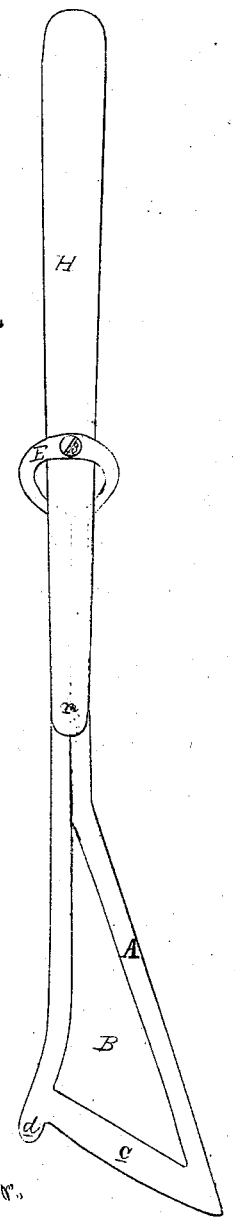

Figure 2 is a side view of the same.

My invention has relation to means for cutting hay in the mow or stack, which may also be used as means for pruning trees; and It consists mainly in a novel arrangement and construction of devices intended for use for either or both of said purposes.

A of the drawings represents the hay or pruning-knife proper.

It consists of a long bar or plate of steel or iron having a circular edge, as shown at $c$, with a sharp spur at $d$ and an open triangular interior, B.

The upper end of this knife proper is formed in the shape of a ring, and is bent to the right on an angle of about forty degrees, more or less, with the line of the knife, to provide for attaching the handle, as hereinafter mentioned. This inclined ring is marked E on the drawings.

The letter $n$ represents a pin, firmly attached to the knife-shank at the point shown. It serves as a foot-rest to aid in forcing the knife into the hay, and also as an aid in attaching the handle to the shank of the knife.

H represents a wooden handle, adapted for attachment to the shank of the knife by passing its lower end through the ring E, in which it is made secure by the screw $s$, and also by passing the small opening near its point over the pin $n$, in the manner shown on the drawings.

For the purpose of cutting hay, the handle H may be dispensed with; but for cutting the limbs of tall trees, I always attach it. The ring E, pin $n$, and screw $s$ render said handle removable and attachable at will.

What I claim as my invention, and desire to secure by Letters Patent, is—

The combined hay and pruning-knife herein described, having knife A, ring E, pin $n$, screw $s$, and removable handle H, when constructed and arranged as specified.

In testimony that I claim the above, I have hereunto subscribed my name in the presence of two witnesses.

DANIEL FASIG.

Witnesses:
 J. P. VAN NEST,
 S. H. FAILOR.